United States Patent [19]

Halpine

[11] 4,150,694
[45] Apr. 24, 1979

[54] ROTARY PLUG VALVE

[75] Inventor: Joseph C. Halpine, Tulsa, Okla.

[73] Assignee: Fluid Measurement Systems, Inc., Tulsa, Okla.

[21] Appl. No.: 819,357

[22] Filed: Jul. 27, 1977

[51] Int. Cl.² ............................................ F16K 39/06
[52] U.S. Cl. .............................. 137/625.47; 251/163; 251/192
[58] Field of Search ........................ 251/162, 163, 192; 137/625.47

[56] References Cited

U.S. PATENT DOCUMENTS

| | | | |
|---|---|---|---|
| 2,459,682 | 1/1949 | Carrie | 251/163 X |
| 2,503,612 | 4/1950 | Burkhardt | 251/162 |
| 2,702,050 | 2/1955 | Thomas | 251/162 X |
| 3,443,592 | 5/1969 | Felmlee | 251/162 X |

Primary Examiner—Arnold Rosenthal
Attorney, Agent, or Firm—Head, Johnson & Chafin

[57] ABSTRACT

An improved rotary plug valve which has a housing having an axial, tapered inner wall forming a tapered inner cavity, with a plurality of radial openings in a transverse plane, at selected angles, leading into the tapered inner cavity. A rotatable tapered plug is adapted to fit inside the tapered cavity, and having "O" ring seal means to seal the outer surface of the plug to the inner wall of the housing. Selected conduits through the plug provide means to control flow of liquid entering one or more of the openings in the housing, to flow through the plug to other selected openings, dependent on the anular position of the plug. The cavity is closed by top and bottom closures. The rotor has an axial shaft, by means of which it can be rotated exteriorly of the valve, by the passage of the shaft up through the center of the top closure. There are cooperating cam surfaces on the top of the plug and the bottom surface of the top closure, and similarly, between the bottom surface of the plug and the top of the bottom closure, such that, as the plug is rotated in one operating position, it is at its lowest position in the tapered cavity, with the surfaces fully sealed, whereas, as it is turned the plug is lifted by the cooperating cam surfaces below, so that there is more clearance between the plug and the tapered inner surface and the rotor can be turned freely.

5 Claims, 4 Drawing Figures

ROTARY PLUG VALVE

BACKGROUND OF THE INVENTION

1. Field of the Invention

This invention lies in the field of valves for the control of flow of fluids. More particularly, it concerns a plug valve in which a tapered plug is seated in a tapered cavity in a housing, so that seal can be provided between the plug and the wall of the cavity.

Still more particularly, it concerns a flow diverter valve having four radial openings in a transverse plane, at right angles to each other, communicating from the outside of the housing to the inner conical cavity, and the plug has two parallel channels cut into the conical surface so that in selected operating positions one channel connects to two adjacent openings and the second channel on the opposite side of the plug connects the two other openings. By rotating the plug 90° the flow directions are changed.

2. Description of the Prior Art

In the prior art there are numerous descriptions of rotary valves with tapered plugs in correspondingly tapered seats or cavities, and with suitable sealing members to seal the openings through the conduits of the plug against the interior surface of the tapered cavity. However, in order to maintain this seal, constant pressure is applied to the plug by spring means, or otherwise, on the top surface of the plug, that is, the surface having the largest diameter of the plug.

With this strong pressure maintaining the plug tightly in contact with the interior wall of the cavity, there is often great friction, which makes it difficult to rotate the plug. Furthermore, rotating the plug under this high degree of friction damages the sealing members, which must be replaced frequently.

This invention is adapted to minimize the wear and tear on the sealing members, and also to provide a relatively friction-free rotation of the plug, except in the narrow zone of rotation where the plug is to be positioned with respect to the openings of the valve.

SUMMARY OF THE INVENTION

It is a primary object of this invention to provide a plug valve having a plurality of openings into a central cavity space, circumferentially around the cavity, and to have a plug which is adapted by means of interior conduits to connect different ones of said plurality of openings as the plug is rotated.

It is a further object of this invention to provide a cam means operating on the bottom surface and the top surface of the plug, to force the plug to its lowest position or tightest sealing position, when it is in proper operating position, to connect selected openings, and alternately to lift the plug toward the wider end of the conical cavity as the plug is turned from one operating position to another operating position.

These and other objects are realized and the limitations of the prior art are overcome in this invention by providing a plug valve having a cylindrical housing which contains an axial conical cavity. The conical wall of the cavity is connected by a plurality of openings through radial pipes to the outside of the valve for purpose of connection of fluid conduits to the plug. The interior of the housing is sealed at top and bottom by suitable closure plates.

The plug is constructed of a taper identical to that of the inner wall of the cavity, so that with suitable sealing members, such as "O" rings, the plug will seat and seal in the cavity. The plug has at least one channel cut into the outer wall of the plug between its ends at a direction substantially perpendicular to the axis or through the plug. This channel is adapted to connect when the plug is in an operating position, between two openings into the internal cavity.

The bottom closure plate has a cam surface on its top surface, which cooperates with a cam surface cut into the bottom surface of the plug, so that, when the plug is in its proper operating position, the plug will rest in its lowest position in the cavity, where the seal members adequately seal the channels of the plug.

Similarly, there are cam surfaces on the lower surface of the top closure plate and the top surface of the plug, which cooperate with each other and with the two cam surfaces below, to accomodate the upward and downward movement of the plug as its is rotated by the shaft attached to the plug.

The top cam surfaces are spring backed so that there is always a downward pressure between the top closure plate and the plug, so that the plug is always resting against the lower cam surfaces or against the interior conical surface, as it would be in the operating positions.

Therefore, in the operating position the spring pressured cam surface at the top forces the plug down into the conical cavity, and provides complete seal of the fluid conduits. When the plug is to be rotated to a new operating position, the bottom cam surfaces, after a selected small angle of rotation lift the plug in the cavity against the pressure of the springs and permit a freer rotation of the plug in the cavity. Inasmuch as this upward movement of the plug will reduce the pressure at the seals, there may be leakage through the plug at that time. Therefore, this feature is only adaptable to valves which can permit this possible leakage of fluid as the valve is rotated.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
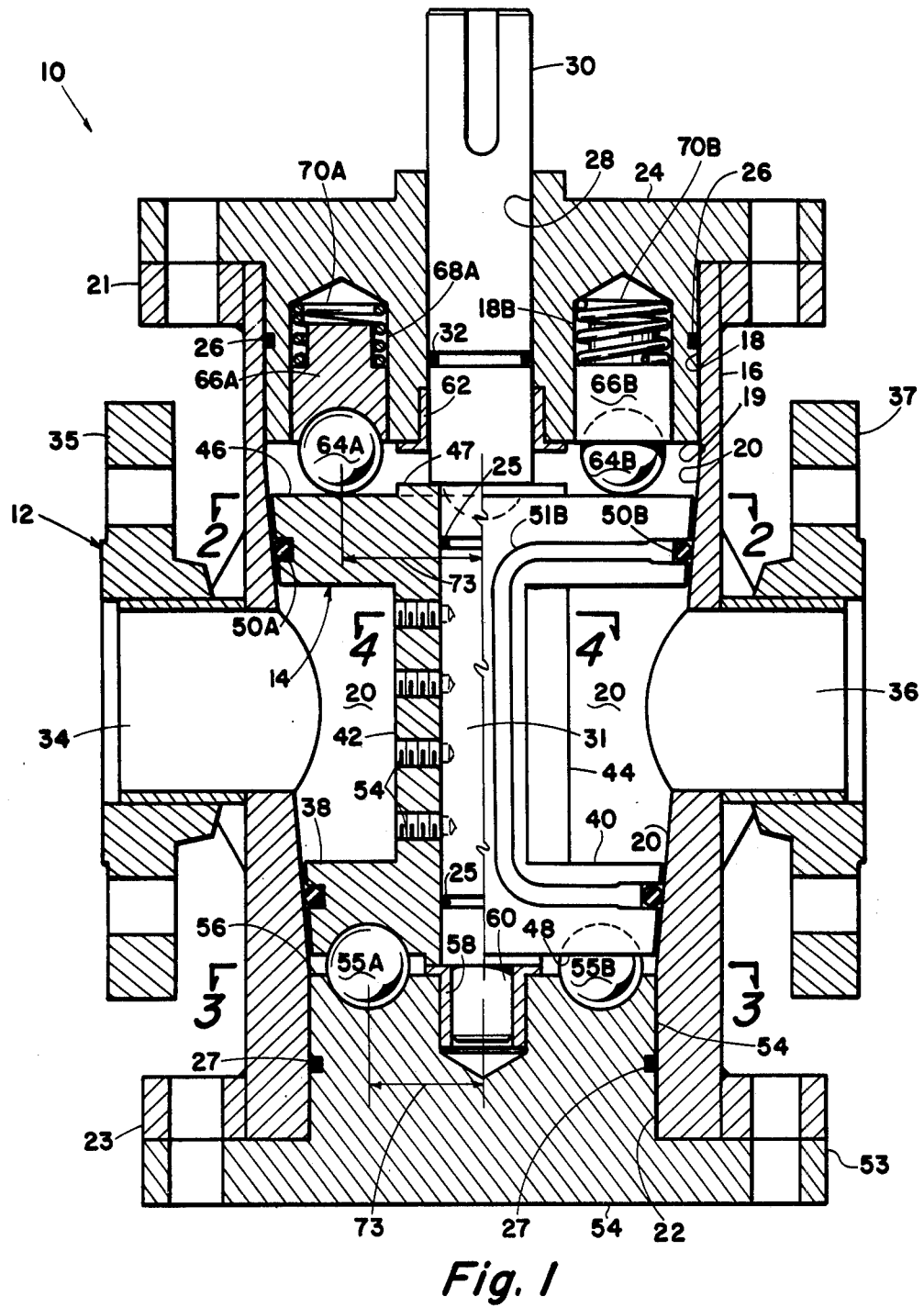
FIG. 1 represents in partial cross-section one embodiment of this invention.

Referring now to the drawings and, in particular, to FIG. 1, there is shown in partial cross-section an elevational view of one embodiment of this invention, indicated generally by the numeral 10. The valve includes a housing indicated generally by the numeral 12 and a rotor indicated generally by the numeral 14. The housing 12 comprises a cylindrical wall 16 which has an internal shape which includes a cylindrical wall 18 at the top connecting to a tapering inwardly wall 20 which leads to another cylindrical wall 54 at the bottom end of the housing.

While this valve can be operated in any position, for convenience in describing the invention, and because there are so many surfaces to be described, it will be described in terms of top and bottom portions of the housing, top and bottom portions of the plug, etc. Each of the terms "top" and "bottom" will be full described in terms of the geomety of the parts. Thus the top of the valve and the plug is that end corresponding to the largest diameter of the plug. The bottom end corresponds to the smallest diameter of the plug.

The housing has a top flange 21 and a bottom flange 23 for the purposes of mounting top and bottom closure plates 24 and 54, respectively. With these top and bottom closure plates the internal volume of the housing comprises a conical cavity having a wall 20 closed at the top by the top closure and closed at the bottom by the bottom closure 54.

The plug 14 comprises a tapered cylinder having the same angle of taper as the internal wall 20 of the tapered cavity, that is, the space inside of the internal wall 20 of the housing. The plug is bored to support an axial shaft 30 which is sealed through the top closure by means of "O" ring 32. The portion that passes through the plug is of slightly lesser diameter and is sealed by "O" rings 25, for example. The plug is held to the shaft portion 31 by means of a plurality of set screws 54 or other suitable means.

Figure 4:
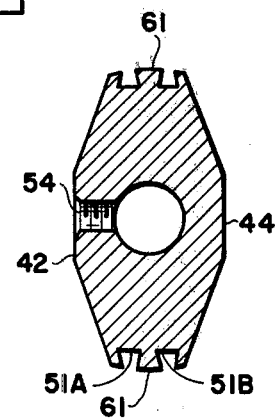
FIG. 4 illustrates in corss-section the view across the plane 4—4 of FIG. 1.

The plug has at least one and preferably two channels 38 and 40 cut into the sidewalls perpendicular to the axis of the plug and parallel to each other, leaving a central wall 42 and 44 in the center of the plug. This is illustrated by the view in FIG. 4, which shows a cross-section of the plug taken across the plane 4—4 of FIG. 1. The two surfaces 61 are portions of the original conical surface of the plug. This outer surface of the plug, comprising the two circular portions at the top and bottom with the two vertical portions 61, are sealed by means of "O" rings 50A and 50B, which seat into dove-tailed grooves 51A and 51B around the conduits 38 and 40. Thus, when one or the other conduit is positioned so as to include two adjacent openings in the housing, the "O" ring 50A OR 50B will completely seal the conduit 38 or 40, as it may be, for the passage of liquid from one to the other of the two adjacent openings, and the plug is in an operating position.

The principal novelty of this invention lies in cam means between the bottom surface 48 of the plug 14 and the top surface 56 of the lower enclosure plate 54 on the one hand, and between the top surface 46 of the plug and the bottom surface 19 of the top closure plate 24 on the other hand. These cam surfaces are preferably cut into the bottom and top surfaces of the plug, and cooperate with the cam surface on the top of the bottom closure and the cam surface on the bottom of the top closure.

While these cam surfaces can be of various types of cooperating surfaces, the primary purpose of the cam surfaces is to raise and lower the plug by a selected small dimension as it is rotated from one operating position, where it diverts a liquid from one inlet to a corresponding outlet, etc. to another operating position, where it conducts liquid from the first opening to a third different outlet, etc, for example. In each operating position the cams permit the plug to be pressed downwardly by means of springs, so that the conical surface of the plug is tightly sealed by the "O" rings 50A and 50B. Yet, when the plug is turned a selected small angle away from the operating position, the cam surfaces thereafter lift the plug a selected amount so that being higher in the conical cavity, it fits less tightly in the cavity and can be rotated more easily without great frictional forces on the sealing members. The amount of lift is such that the sealing members still are effective but they are not pressed as tightly, and do not seal as tightly against the inner surface of the conical cavity, as they are in the operating positions.

In the embodiment shown in FIG. 1 the cam surface on the top surface of the bottom closure plate 54 comprises two steel balls 55A and 55B, which are seated in corresponding cavities, which are at a radius 73 and are both on a line passing through the axis. These balls do not necessarily roll. They may just press and slide along the corresponding cam surface on the bottom surface of the plug. Similarly, the top cam surface on the top closure 24 are balls 64A and 64B which are positioned at the same radius 73 on a line through the axis. These balls are seated in corresponding cavities in two cylindrical plugs 66A and 66B, which fit into corresponding cavities in the top closure plate 24. These plugs 66 are pressed downwardly by means of springs 70A and 70B, so that there is a selected downward force applied between the top closure plate and the plug, so that, when the bottom cam surfaces permit, the pressure forces the conical plug downward in the conical seat at the selected pressure providing a selected sealing capability.

The corresponding cam surfaces on the bottom surface of the plug and the top surface of the plug comprise a plurality of shallow cavities or depressions in these surfaces. These depressions follow generally a circle of a radius the same as the center of the balls, namely 73.

In the design illustrated, the valve is a four-way valve, although it is clear that the valve can be a three-way valve, if desired, or a four-way valve. Also, it could be a two-way valve having a single passage through the plug from one inlet to another. It could provide a single channel through the plug, which passes through the axis, in which case the inlet and outlet openings are co-axial, etc. The invention is not limited to a two-way, three-way, or four-way type of valve.

Figure 2:
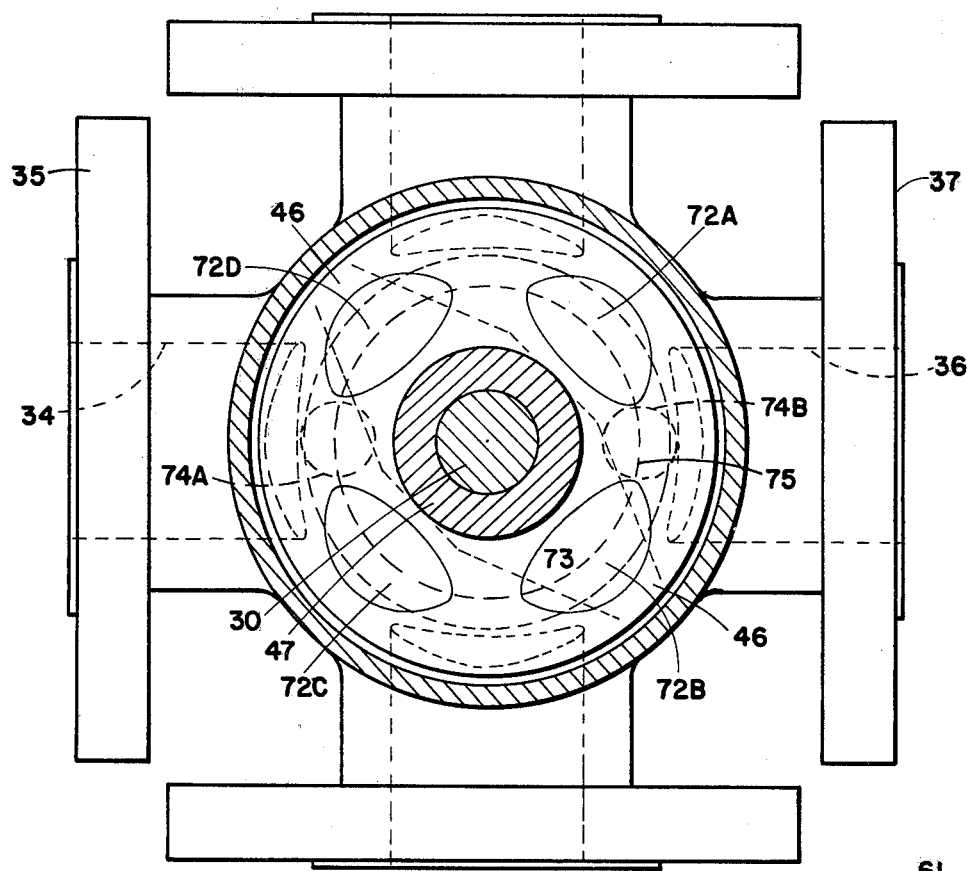
FIG. 2 illustrates a cross-sectional view taken along the plane 2—2 of FIG. 1.
Figure 3:
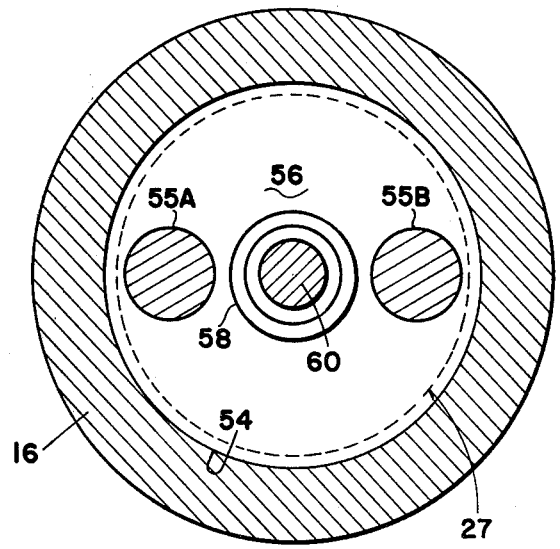
FIG. 3 illustrates a cross-sectional view taken across the plane 3—3 of FIG. 1.

For the four-way type of valve illustrated, and referring to FIG. 2, which illustrates the top surface 46 of the plug, there is seen a dashed line 75 at the radius 73, and there are four dashed openings corresponding to the four openings 34, 36, etc., there are four depressions 72A, 72B, 72C and 72D in the top surface. Shown in dahsed outline 74A and 74B are two circles which represent the balls 64A and 64B. In the position shown the balls 64A and 64B are resting on the top surface 46 of the plug but, as the plug turns counter clockwise through a small angle, the ball 64A, for example, falls down into the depression 72D, while the ball 74B falls down into the depression 72B. At the same time the balls 55A and 55B underneath the plug, are originally in depressions, press upwardly on the cam surface and cause the plug to move upwardly. This is permitted, since the top balls 64 have dropped into the depressions, permitting the plug and the shaft to move upwardly by a selected short distance, and thereby lifting the plug that same distance.

To permit this upward and downward movement of the plug and shaft, bushings 62 at the top and 58 at the bottom are provided in the housing to provide a minimum friction to this upward and downward movement.

Instead of having the cam surface illustrated in FIG. 2 on the top surface of the plug, it can be a smooth surface, and the springs 70A and 70B can be compressed by the cam surface below as the plug rotates, which makes for a simpler operation. Consequently, the cam surface can be reduced to a single pair of cam surfaces below, with the top cam surface comprising the balls 64 being caused to move upwardly against the spring force, when the cam moves the plug upwardly, and vice versa, the springs forcing the plug downwardly as the rotor turns into an operating position and the bottom cams separate slightly permitting the pressure of the seals between the plug and the housing to be determined by the spring force.

What has been described as a, more or less, conventional type of multi-inlet and outlet plug valve, having a conical seat in a housing, and a conical plug sealed therein, and having spring force applied to the plug at the top to maintain adequate seal between the plug and the housing. It further includes at least one pair of contact cam surfaces on the bottom which, when the plug is in an operating position, are very slightly separated but, as the plug turns either direction from the operating position, the cam surfaces act to lift the plug a selected small distance in its cavity, to permit freer rotation of the plug while still maintaining seal. Further, if desired, a corresponding pair of cam surfaces can be provided at the top surface of the plug to cooperate with the cam surfaces at the bottom.

Whereas the present invention has been described in particular relation to the drawings attached hereto, it should be understood that other and further modifications, apart from those shown or suggested herein may be made within the spirit and scope of this invention.

What is claimed is:

1. A rotary plug valve comprising:
   (a) a housing having an axial tapered inner wall forming a tapered inner cavity and a plurality of radial openings at selected angles leading through said tapered wall into said tapered inner cavity;
   (b) a rotatable tapered plug adapted to fit said tapered cavity, the plug having a top and bottom surface, and having seal means to seal the outer surface of the plug to said housing inner wall, and the plug having at least one conduit opening therethrough, whereby when said plug is seated in said cavity, liquid entering an opening in said housing will flow through said conduit opening in said plug to another opening in said housing dependent on the angular position of the plug;
   (c) top and bottom closure plates affixed to said housing to seal the ends of said housing inner cavity, the top closure plate having an axial opening for sealing a shaft axially connected to said plug;
   (d) a cam surface on the plug bottom surface adapted to cooperate with a corresponding cam surface on the bottom closure plate, whereby when said plug is rotated in said cavity, it will be alternately lifted, and depressed by said cam surfaces; and
   (e) a cam surface on said top closure adapted to cooperate with a cam surface on the top of said plug, whereby as said plug is rotated about its axis in one direction it will be pressed down by said top plate cam surface, into sealing engagement with the housing inner wall, and lifted up to provide free, low resistance rotation by the bottom plate cam surface when said plug is rotated in the opposite direction.

2. The valve as in claim 1 in which the number of said openings in said housing is four and the number of conduits in said plug is two.

3. The valve as in claim 2 in which the two conduits in said plug comprise channels substantially perpendicular to the axis of said plug intermediate the ends and on opposite sides of said plug, the top and bottom surfaces of said channels defining a top and bottom web of selected thickness.

4. The valve as in claim 3 in which said seal means of said plug comprises an "O" ring means in channels inserted in the outer surface of said plug surrounding each of said two channels, said plug being pressed into sealing engagement when it is in operating position and each channel bridges between two adjacent openings in said housing.

5. The valve as in claim 1 in which said cam surface on said bottom closure plate comprises two balls seated in cavities and spaced at equal radius on the same diameter, and the cam surface on the bottom end of said plug comprises four depressed areas on a circle of radius equal to that of said two balls whereby when said plug is in sealing condition said balls project into said depressed areas, said cam surface on said top closure comprises two balls supported in cavities respectively, in two spring-backed plugs, and the cam surface on the top end of said plug comprises four depressed areas on a circle of radius equal to that of said two balls, said four depressed areas in the top and bottom surfaces of said plug being positioned 90° in azimuth from each other.

* * * * *